United States Patent [19]

Clarke

[11] 4,317,616

[45] Mar. 2, 1982

[54] FLUOROSILOXANE OPTICAL CLADDING

[75] Inventor: Raymond Clarke, Mt. View, Calif.

[73] Assignee: Raychem Corporation, Menlo Park, Calif.

[21] Appl. No.: 82,780

[22] Filed: Oct. 9, 1979

[51] Int. Cl.³ .................................................. G02B 5/14
[52] U.S. Cl. ............................ 350/96.34; 350/96.30; 427/163
[58] Field of Search ......................... 350/96.30, 96.34; 427/163; 428/373, 378

[56] References Cited

U.S. PATENT DOCUMENTS

| | | | |
|---|---|---|---|
| 3,262,810 | 7/1966 | Campbell | 428/266 |
| 3,434,776 | 3/1969 | Kern | 350/96.34 |
| 3,480,458 | 11/1969 | Dislich et al. | 350/96.34 |
| 3,529,003 | 9/1970 | Rausch et al. | 556/448 |
| 3,779,627 | 12/1973 | Pinnow et al. | 350/96.34 |
| 4,036,807 | 7/1977 | Atherten | 260/42.15 |
| 4,125,644 | 11/1978 | Ketley et al. | 427/163 |

FOREIGN PATENT DOCUMENTS

| | | |
|---|---|---|
| 2426917 | 12/1979 | France . |
| 1441086 | 6/1976 | United Kingdom . |
| 1524316 | 9/1978 | United Kingdom . |

OTHER PUBLICATIONS

*Optical Fiber Communications,* Miller and Chynoweth, Academic Press, N.Y., 1979 pp. 329–330.
*Fiber Optics for Naval Applications: An Assessment of Present and Near-Term Capabilities,* G. Sigel, Jr., NRL Report 8062, 1976 Naval Research Laboratory, Wash. D.C. pp. 10–11.

*Primary Examiner*—John D. Lee
*Attorney, Agent, or Firm*—Lyon & Lyon

[57] ABSTRACT

A waveguide comprises an optical fiber core and a cross-linked polyfluorosiloxane cladding having a fluorine content of from 1 to 52% by weight. The use of polyfluorosiloxane cladding produces a waveguide having a high numerical aperture.

26 Claims, No Drawings

FLUOROSILOXANE OPTICAL CLADDING

BACKGROUND

The use of fiber optics for transmitting information has recently received a great deal of attention because of the light weight, security, safety, and electrical isolation that can be obtained with a fiber optic system, and the enormous amount of information that can be transmitted through each fiber of a fiber optic system. Fiber optic systems use a waveguide for transmitting light between a light emitter and a light detector. Waveguides consisting of a variety of materials have been developed. For example, waveguides consisting of a glass core and glass cladding, glass cladding and a liquid core, a polymeric core and polymeric cladding, and a glass core and polymeric cladding are known. U.S. patent application Ser. No. 964,506 filed by Ellis et al on Nov. 29, 1978, now U.S. Pat. No. 4,290,668, which is incorporated herein by reference, is directed to waveguides comprised of a quartz glass core and polymeric cladding of polydimethyl siloxane.

An important property of a waveguide is its numerical aperture. Light energy entering the end surface of a waveguide is accepted and transmitted down the core only for those entry angles within an acceptance cone. The half angle of the "acceptance cone" or "numerical aperture" (NA) is a function of the core/cladding indices of refraction as follows:

$$NA = \sin \theta_c = (n_1^2 - n_2^2)^{\frac{1}{2}}$$

where
$n_1$ = index of refraction of the core;
$n_2$ = index of refraction of the cladding; and
$\theta_c$ = acceptance cone half-angle.

Thus, the numerical aperture of a waveguide is proportional to the difference between the refractive index of the core and the refractive index of the cladding. The higher the numerical aperture of a waveguide, the greater the percentage of light provided by a light emitter that enters the core of the waveguide. Therefore, it is advantageous for efficient transmission of light to use a waveguide with a high numerical aperture.

Another advantage of using a waveguide with a high numerical aperture is that alignment between a light emitter and a waveguide is less critical. This permits smaller cores to be used in a waveguide, and permits workers in the field to partially misalign a waveguide and a light emitter, without having intolerable light losses.

A problem with a waveguide made with polydimethyl siloxane cladding and a quartz glass core is that polydimethyl siloxane has a refractive index of approximately 1.40, while the quartz core has a refractive index of about 1.46. Thus, the numerical aperture of this combination of materials is only about 0.414. It would be desirable to have claddings that have a refractive index lower than 1.40 so that wave guides with numerical apertures higher than about 0.45 can be produced.

There are other problems with use of polydimethyl siloxane as a cladding. For example, it has limited use at low temperatures. A frequent military requirement for communication systems is operability at temperatures lower than $-55°$ C. Polydimethyl siloxane can crystallize at about $-50°$ C., which can give rise to an increase in optical attenuation. Thus, silicone cladding generally is not used for very low temperature applications.

Another problem with many types of polymeric cladding materials is relatively poor oil resistance. In some applications, such as systems proximate to hydraulic mechanisms, it is important that the cladding be oil resistant. If it were not, the cladding could absorb some oil, which could change the light transmitting properties of the waveguide.

In view of the foregoing, it is apparent that there is a need for a waveguide cladding that is oil resistant, has a low refractive index, and which can be used at temperatures lower than $-55°$ C. without adversely affecting the operational and mechanical properties of the waveguide.

SUMMARY

The present invention is directed to a waveguide having a cladding with the above features. The waveguide comprises an optical fiber core and an optically clear, elastomeric cross-linked polyfluorosiloxane cladding, the polyfluorosiloxane including fluoroalkyl side chains containing at least three carbon atoms. The cladding is disposed on and around the exterior surface of the core. The polyfluorosiloxane has a fluorine content of from 1 to 52% by weight, the presence of the fluorine being responsible for the lower refractive index of the polyfluorosiloxane. The cured polyfluorosiloxane has an elastic modulus of less than $10^7$ Newtons per square meter (N/m$^2$), which is desirable because at a higher elastic modulus, excessive microbending light losses are incurred along the waveguide. Preferably there is substantially no fluorine substitution in the fluoroalkyl side chains nearer to the silcon atom than the gamma carbon atom to avoid hydrolytic instability. Because the polyfluorosiloxane cladding can have a refractive index substantially lower than 1.40, the waveguide has a higher numerical aperture than is achievable with a polydimethyl siloxane cladding on the same core material.

Other aspects, advantages and features of a waveguide according to the present invention will become better understood with reference to the following description and appended claims.

DESCRIPTION

The present invention is directed to a novel waveguide comprising an optical fiber core and a cladding comprised of elastomeric cross-linked polyfluorosiloxane. The particular core used is not critical to the present invention, as long as it is compatible with a polyfluorosiloxane cladding. Exemplary of types of cores in use are various types of glass and polymeric materials such as polymethyl methacrylate. Preferably the core has a high refractive index so that the combination of the low refractive index polyfluorosiloxane and the core material produces a waveguide having a high numerical aperture. A core material that is satisfactory for use with a polyfluorosiloxane cladding is a fused silica or quartz core, which has a refractive index of approximately 1.46. As used herein, all refractive indices mentioned refer to the refractive index of a material measured at a temperature of 25° C. with visible light of wavelength 589 nm.

The elastomeric cross-linked polyfluorosiloxane cladding consists essentially of the repeating units

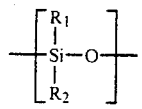

where each $R_1$ and $R_2$ is independently selected from the group consisting of:
(i) alkyl groups containing from one to eight carbon atoms;
(ii) fluorine substituted alkyl groups containing from 3 to 8 carbon atoms with no fluorine atoms at the alpha and beta carbon atoms; and
(iii) polyfluoroalkoxy alkyl groups containing up to 8 carbon atoms and at least 2 fluorine atoms with the alkoxy group having from 1 to 6 carbon atoms and the alkyl group having from 2 to 6 carbon atoms with no fluorine substitution of the alpha and beta carbon atoms of the alkyl groups, where a sufficient portion of the $R_1$ and $R_2$ groups is a fluorine substituted group so that the polyfluorosiloxane contains at least 1% by weight fluorine. The repeating units can be the same or different.

The side chains $R_1$ and $R_2$ of the repeating units preferably contain no more than 8 carbon atoms and the alkyl portion and the alkoxy portion of the polyfluoroalkoxy alkyl group preferably contain no more than 6 carbon atoms, because, with an increasing number of carbon atoms, the polyfluorosiloxane side chains begin exhibiting a tendency to crystallize at low temperatures, thereby becoming less optically clear. Moreover, crystallization is undesirable because it adversely affects the low temperature optical properties of the cladding.

It is preferred that the fluorine substituted alkyl group contains at least three carbon atoms to avoid having fluorine substitution at the alpha and beta carbon atoms. It is known that having fluorine substitution nearer to the silicone atom than the gamma atom produces hydrolytic instability (O. R. Pierce, *Fluorosiloxanes, Applied Polymer Symposium Series Number* 14, pages 7–15). When waveguides are used in applications requiring exposure to water, hydrolytic stability of the cladding is important.

The higher the fluorine content of the cladding, the lower is its refractive index. Thus, the polyfluorosiloxane contains at least 1% by weight of fluorine and preferably at least 30% by weight fluorine. For the same reason, the polyfluoroalkoxy alkyl group contains at least 2 fluorine atoms. A homopolymer of poly 3,3,4,4,5,5,5-heptafluoropentylmethylsiloxane can be used for the cladding and possesses a fluorine content of 52% by weight.

Preferably $R_1$ and $R_2$ consist essentially of carbon atoms, hydrogen atoms, and fluorine atoms. The presence of any other species raises the refractive index of the polyfluorosiloxane. However, in some specialized applications, it may be desirable to have some sulfur, bromine, chlorine, or nitrogen substitution.

$R_1$ and $R_2$ can be linear or branched. Usually only one of $R_1$ and $R_2$ is substituted with fluorine, although both can be substituted. Also, in some of the repeating units, neither $R_1$ nor $R_2$ is substituted, although overall, sufficient $R_1$ and $R_2$ need to be substituted with fluorine that at least 1% by weight of the polyfluorosiloxane is fluorine. Exemplary of non-substituted side chains are the methyl, ethyl, propyl, butyl, isobutyl, pentyl, isopentyl, and hexyl groups, and the like. Exemplary of suitable substituted side chains are 3,3,3-trifluoropropyl, 3,3,4,4,4-pentafluorobutyl, heptafluoroisopropoxy ethyl and 3,3,4,4,5,5,5-heptafluoropentylmethyl groups.

Exemplary of a polyfluoralkoxy alkyl group attached to a silicon atom is:

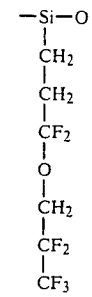

It should be noted that there is no fluorine substitution of the α and β carbon atoms of the alkyl portion of the polyfluoroalkoxy group and that the alkyl portion and/or alkoxy portion can be fluorine substituted.

With a polyfluorosiloxane cladding that has too high an elastic modulus, microbending losses of light in the fiber can result. To prevent such microbending losses, preferably the cladding has an elastic modulus of less than $10^7 \text{N/m}^2$. The elastic modulus is measured according to ASTM test method D-638.

The polyfluorosiloxane is chosen to be optically clear at the wavelength of light to be transmitted in the waveguide. It should be noted that waveguides of the present invention are not limited to use with visible light, but can be used with both infrared light and ultraviolet light.

Generally the polyfluorosiloxane is cross-linked in situ. In applying a polyfluorosiloxane cladding to an optical fiber, it is necessary to coat the fiber before moisture or other contaminants can reach the fiber. In addition, if the fiber is scratched or otherwise abraded in any way it can drastically reduce the tensile strength of the fiber. With these problems in mind, it is preferred to apply the coating from a low modulus applicator such as that described by A. C. Hart, Jr. and R. B. Albarino in "An Improved Fabrication Technique for Applying Coatings to Optical Fiber Waveguides", Optical Fiber Transmission II Proceedings, February 1977.

Preferably the polyfluorosiloxane is applied to the fiber core as a pure liquid. If the polyfluorosiloxane is too viscous prior to cure, it is difficult to apply to the core. Alternatively, it is possible to dissolve the fluorosiloxane together with a peroxide in a volatile solvent such as methylisobutyl ketone. In the latter case, the coating is applied and the solvent evaporated in an oven to leave a thin layer of cross-linked material. Two ovens can be used, a first oven at about 100° C. for vaporizing the solvent, and a second oven at about 870° C. for cross-linking the polyfluorosiloxane. Because of the difficulty in removing the solvent completely, it is preferable to build up the coating by going through a succession of applicators and ovens. A protective coating such as Sylgard 184 (available from Dow Corning) can be applied over the thin polyfluorosiloxane coating.

Different techniques can be used for obtaining the cross-linking necessary to have a long lasting and oil resistant cladding. As noted, polyfluorosiloxanes can be cured by using peroxides. In this case, the polyfluorosiloxane can contain a small amount of vinyl unsaturation to facilitate cross-linking.

Alternatively, the polyfluorosiloxane can be cross-linked using a two-part addition system in which a first fluorosiloxane component contains a small proportion of hydride (SiH) groups and a second fluorosiloxane component contains vinyl groups. The reaction of these two groups is accelerated by using a catalyst such as hexachloroplatinic acid.

The technology for making polyfluorosiloxane elastomers is well known and many polyfluorosiloxane elastomers are commercially available. Polyfluorosiloxane elastomers can be made by hydrolyzing suitable dichloromethyl fluoroalkyl silanes. Examples of suitable silane monomers are 3,3,3-trifluoropropylmethyldichlorosilane, 3,3,4,4,4-pentafluorobutyl methyldichlorosilane, heptafluoroisopropoxyethylmethyl dichlorosilane, and 3,3,4,4,5,5,5-heptafluoropentylmethyldichlorosilane.

There are many advantages to the waveguides of the present invention having an elastomeric polyfluorosiloxane cladding. For example, a waveguide of high numerical aperture can be produced. A waveguide consisting of a fused silica core having a refractive index of about 1.46 and poly 3,3,3-trifluoropropylmethylsiloxane having a refractive index of about 1.38 yields a waveguide having a numerical aperture in excess of 0.45, and in the order of 0.476. If polydimethyl siloxane were used as a cladding material, the numerical aperture would only be about 0.414. Because of its high numerical aperture, the waveguide of the present invention is an efficient light receiver. In addition, installation of the waveguide is easy, because alignment between the waveguide and a light emitter is not as critical as with a waveguide having a lower numerical aperture.

Other advantages of the waveguide include its oil resistance and its ability to be used at low temperatures. For example, poly 3,3,3-trifluoropropylmethylsiloxane is not crystalline and has a glass transition temperature in the order of −68° C. Thus, there is no problem in using poly 3,3,3-trifluoropropylmethylsiloxane elastomer as an optical cladding at temperatures even below −60° C.

These and other features, aspects and advantages of the present invention will become better understood with reference to the following examples.

EXAMPLE 1 (Peroxide Cure)

Thirty grams of poly 3,3,3-trifluoropropylmethyl siloxane available from General Electric Company of Waterford, New York, under the trade name "FSE 2080", is dissolved in 100 mililiters of methylisobutylketone to form a solution having a viscosity of approximately 4500 centipoise. Five grams of 2, 5-dimethyl-2, 5 bis (t-butyl peroxy) hexyne are added to the solution. The solution is applied from an applicator to a quartz core having a diameter of about 200 microns, the fiber moving at a speed of about 0.2 meter per second. The solvent is partially evaporated in air, and then is completely evaporated by passing the coated fiber through an oven at 870° C. The coating produced is uniformly disposed about the core and is approximately 5 microns thick.

EXAMPLE 2 (Peroxide Cure)

30 g of FSE 2080 are dissolved in 100 mls methylisobutylketone and 1 gram of 2,4-dichlorobenzoylperoxide is added. The solution is applied from an applicator to a quartz core of about 200 microns diameter moving at a speed of about 0.13 meters/second. The oven temperature is 650° C. The coating produced is smooth, containing no pin holes and is about 5 microns thick.

EXAMPLE 3 (2-part addition Cure)

A first solution of poly 3,3,3-trifluoropropylmethylsiloxane containing about 1 mole percent of methylvinyl siloxane units and about 1 mole percent of dimethyl vinyl siloxane units is prepared. The first solution has a viscosity of 5000 cps and to this solution is added 2% by weight of a solution of 18 parts by weight of a platinum cyclohexene complex having the formula $(PtCl_2C_6H_{10})_2$ dissolved in 10,000 parts by weight of benzene to form a second solution. To 100 grams of the second solution there are added 10 grams of polymethyl 3,3,3-trifluoropropylmethylsiloxane which has a viscosity of 700 cps and which contains about 2 mole percent of dimethyl hydrogen siloxane units; thereby forming a third solution. The third solution is degassed in a vacuum oven at room temperature to remove air and is applied to a quartz core fiber of 200 microns diameter moving at 0.2 meter per second through an applicator to give a coating 20 microns thick when cured in an oven at 870° C.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A waveguide comprising a light transmitting optical fiber core and an optically clear, elastomeric, cross-linked polyfluorosiloxane cladding in contact with the core, the polyfluorosiloxane having a fluorine content of from 1 to 52% by weight, an elastic modulus of less than about $10^7$ N/m$^2$, and substantially no fluorine substitution nearer to the silicon atom than the gamma carbon atom.

2. The waveguide of claim 1 wherein the polyfluorsiloxane has a fluorine content of from 30 to 52% by weight.

3. The waveguide of claim 1 in which the polyfluorsiloxane is cross-linked poly 3,3,3-trifluoropropylmethylsiloxane.

4. The waveguide of claim 1 in which the cladding has a refractive index of less than 1.4.

5. The waveguide of claim 4 in which the cladding has a refractive index of less than 1.38.

6. The waveguide of claim 1 in which the core is silica, the waveguide having a numerical aperture of at least 0.45.

7. A waveguide comprising a light transmitting optical fiber core and an optically clear, elastomeric, cross-linked polyfluorosiloxane cladding in contact with the core, the polyfluorosiloxane consisting essentially of the repeating units

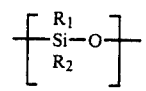

where each $R_1$ and $R_2$ is independently selected from the group consisting of (i) alkyl groups having from 1 to 8 carbon atoms and (ii) fluorine substituted alkyl groups containing from 3 to 8 carbon atoms with no fluorine substitution at the alpha and beta carbon atoms, wherein sufficient $R_1$ and $R_2$ groups are a fluorine substituted alkyl group that the repeating units contain from 1 to 52% by weight fluorine, the cladding having an elastic modulus of less than about $10^7$ N/m².

8. The waveguide of claim 7 in which $R_1$ is the 3,3,3-trifluoropropyl group.

9. The waveguide of claim 8 in which $R_2$ is the methyl group.

10. A waveguide comprising a light transmitting optical fiber core and an optically clear, elastomeric, cross-linked polyfluorosiloxane cladding in contact with the core, the polyfluorosiloxane consisting essentially of the repeating units

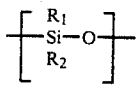

where each $R_1$ and $R_2$ is independently selected from the group consisting of:
(i) alkyl groups having from 1 to 8 carbon atoms;
(ii) fluorine substituted alkyl groups containing from 3 to 8 carbon atoms with no fluorine substitution at the alpha and beta carbon atoms; and
(iii) polyfluoralkoxy alkyl groups containing up to 8 carbon atoms and at least 2 fluorine atoms with the alkoxy group having from 1 to 6 carbon atoms and the alkyl group having from 2 to 6 carbon atoms with no fluorine substitution at the alpha and beta carbon atoms of the alkyl group, wherein sufficient $R_1$ and $R_2$ groups are a fluorine substituted group that the repeating units contain from 1 to 52% by weight fluorine, the cladding having an elastic modulus of less than about $10^7$ N/m².

11. The waveguide of claim 7 or 10 in which the polyfluorosiloxane contains at least 30% by weight fluorine.

12. The waveguide of claim 7 or 10 in which the cladding has a refractive index of less than 1.4.

13. The waveguide of claim 12 in which the cladding has a refractive index of less than 1.38.

14. The waveguide of claim 7 or 10 in which the core is silica and the waveguide has a numerical aperture of at least 0.45.

15. A waveguide comprising a first light transmitting layer and a second, elastomeric, optically clear, cross-linked polyfluorosiloxane, light reflecting layer in contact with the first layer and having a lower index of refraction than the first layer, the polyfluorosiloxane having a fluorine content of from 1 to 52% by weight, an elastic modulus of less than about $10^7$ N/m², and substantially no fluorine substitution nearer to the silicon atom than the gamma carbon atom.

16. The waveguide of claim 15 wherein the polyfluorosiloxane has a fluorine content of from 30 to 52% by weight.

17. The waveguide of claim 15 in which the polyfluorosiloxane is cross-linked poly 3,3,3-trifluoropropylmethylsiloxane.

18. The waveguide of claim 15 in which the second layer has a refractive index of less than 1.4.

19. The waveguide of claim 18 in which the second layer has a refractive index of less than 1.38.

20. A waveguide comprising a first light transmitting layer and a second, elastomeric, optically clear, cross-linked polyfluorosiloxane, light reflecting layer in contact with the first layer, the polyfluorosiloxane consisting essentially of the repeating units

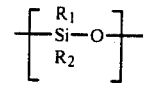

where each $R_1$ and $R_2$ is independently selected from the group consisting of (i) alkyl groups having from 1 to 8 carbon atoms and (ii) fluorine substituted alkyl groups containing from 3 to 8 carbon atoms with no fluorine substitution at the alpha and beta carbon atoms, wherein sufficient $R_1$ and $R_2$ groups are a fluorine substituted alkyl group that the repeating units contain from 1 to 52% by weight fluorine, the second layer having an elastic modulus of less than about $10^7$ N/m².

21. The waveguide of claim 20 in which $R_1$ is the 3,3,3-trifluoropropyl group.

22. The waveguide of claim 21 in which $R_2$ is the methyl group.

23. A waveguide comprising a first light transmitting layer and a second elastomeric, optically clear, cross-linked polyfluorosiloxane, light reflecting layer in contact with the first layer, the polyfluorosiloxane consisting essentially of the repeating units

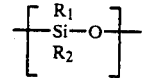

where each $R_1$ and $R_2$ is independently selected from the group consisting of:
(i) alkyl groups having from 1 to 8 carbon atoms;
(ii) fluorine substituted alkyl groups containing from 3 to 8 carbon atoms with no fluorine substitution at the alpha and beta carbon atoms; and
(iii) polyfluoroalkoxy alkyl groups containing up to 8 carbon atoms and at least 2 fluorine atoms with the alkoxy group having from 1 to 6 carbon atoms and the alkyl group having from 2 to 6 carbon atoms with no fluorine substitution at the alpha and beta carbon atoms of the alkyl group, wherein sufficient $R_1$ and $R_2$ groups are a fluorine substituted group that the repeating units contain from 1 to 52% by weight fluorine, the second layer having an elastic modulus of less than about $10^7$ N/m².

24. The waveguide of claim 20 or 23 in which the polyfluorosiloxane contains at least 30% by weight fluorine.

25. The waveguide of claim 20 or 23 in which the second layer has a refractive index of less than 1.4.

26. The waveguide of claim 25 in which the second layer has a refractive index of less than 1.38.

* * * * *